(12) United States Patent
Kanai et al.

(10) Patent No.: US 12,386,694 B2
(45) Date of Patent: Aug. 12, 2025

(54) REGISTERING APPARATUS, REGISTERING METHOD, AND PROGRAM

(71) Applicant: Nippon Telegraph and Telephone Corporation, Tokyo (JP)

(72) Inventors: Shunsuke Kanai, Musashino (JP); Haruhisa Nozue, Musashino (JP); Norio Yamamoto, Musashino (JP); Fumika Asai, Musashino (JP); Kenichi Tayama, Musashino (JP); Di Li, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 19 days.

(21) Appl. No.: 18/576,404

(22) PCT Filed: Jul. 8, 2021

(86) PCT No.: PCT/JP2021/025742
§ 371 (c)(1),
(2) Date: Jan. 4, 2024

(87) PCT Pub. No.: WO2023/281688
PCT Pub. Date: Jan. 12, 2023

(65) Prior Publication Data
US 2024/0330101 A1   Oct. 3, 2024

(51) Int. Cl.
*G06F 11/00* (2006.01)
*G06F 11/07* (2006.01)

(52) U.S. Cl.
CPC ...... *G06F 11/0793* (2013.01); *G06F 11/0787* (2013.01); *G06F 2201/81* (2013.01)

(58) Field of Classification Search
CPC ............ G06F 11/0793; G06F 11/0787; G06F 11/0751; G06F 11/079; G06F 2201/81
USPC ....................................................... 714/1–57
See application file for complete search history.

(56) References Cited

U.S. PATENT DOCUMENTS

| | | | |
|---|---|---|---|
| 2009/0063900 A1* | 3/2009 | Yoshida | G06F 11/0781 714/E11.147 |
| 2016/0253246 A1* | 9/2016 | Chow | G06F 11/1464 714/19 |
| 2019/0095265 A1* | 3/2019 | Dome | G06F 11/3466 |
| 2021/0227009 A1* | 7/2021 | Carney Landow | H04L 65/612 |
| 2023/0273852 A1* | 8/2023 | Anand | G06F 11/3006 714/15 |

FOREIGN PATENT DOCUMENTS

JP    2018028778    2/2018

* cited by examiner

*Primary Examiner* — Sarai E Butler
(74) *Attorney, Agent, or Firm* — Fish & Richardson P.C.

(57) ABSTRACT

The registration device according to the embodiment includes an acquisition unit, a generation unit, a temporary registration unit, a calculation unit, a determination unit, and a registration unit. The acquisition unit acquires log data regarding a fault related to a faulty device in which a fault has been estimated to have occurred and a peripheral device installed around the faulty device. The generation unit generates a group including similar event logs issued at a certain frequency or more from the log data. When an event log in a group including an event log corresponding to training data for solving a fault corresponds to operation data related to an operation of a certain device in the group, the temporary registration unit registers the operation data as temporary training data.

8 Claims, 8 Drawing Sheets

Fig. 3

| TYPE | Syslog | DEVICE IP | REGULAR EXPRESSION | COUNTERMEASURE CONTENT |
|---|---|---|---|---|
| TRAINING A | restart port:03 | — | restart port:ID<> | CARD RESTART (COUNTERMEASURES) |
| TRAINING B | restart-OK | — | restart-OK | CARD RESTART (RECOVERY) |
| OPERATION A | restart port:12 | XX | | |
| OPERATION B | re-insert card:04 | YY | | |

Fig. 5

| TYPE | Syslog | DEVICE IP | REGULAR EXPRESSION | COUNTERMEASURE CONTENT |
|---|---|---|---|---|
| TRAINING A | restart port:03 | — | restart port:ID<> | CARD RESTART (COUNTERMEASURES) |
| OPERATION A | restart port:12 | XX | restart port:ID<> | CARD RESTART (RECOVERY) |
| | | | | |

Fig. 6

| DEVICE IP | MATCHING DEGREE OF OPERATION DATA CORRESPONDING TO TRAINING DATA | | | | | | |
|---|---|---|---|---|---|---|---|
| | CARD RESTART | | | PORT CHANGE | | | |
| | COUNTER-MEASURES | RECOVERY | CERTAINTY FACTOR | COUNTER-MEASURES | COUNTER-MEASURES | RECOVERY | CERTAINTY FACTOR |
| XX | ○ | ○ | 2/2 | × | × | × | 0/3 |
| YY | × | × | 0/2 | × | × | × | 0/3 |

Fig. 8

| TYPE | Syslog | DEVICE IP | REGULAR EXPRESSION | COUNTERMEASURE CONTENT |
|---|---|---|---|---|
| TRAINING | restart port:03<br>restart port:12 | — | restart port:ID◇ | CARD RESTART (COUNTERMEASURES) |
| TRAINING | restart-OK | — | restart-OK | CARD RESTART (RECOVERY) |

REGISTERING APPARATUS, REGISTERING METHOD, AND PROGRAM

CROSS-REFERENCE TO RELATED APPLICATIONS

This application is a National Stage application under 35 U.S.C. § 371 of International Application No. PCT/JP2021/025742, having an International Filing Date of Jul. 8, 2021, the disclosure of which is considered part of the disclosure of this application, and is incorporated by reference in its entirety into this application.

TECHNICAL FIELD

Embodiments relate to a registration device, a registration method, and a program.

BACKGROUND ART

There is a technique for extracting a combination of unique fault events for each fault case from a database in which fault cases of networks are registered so that there is no overlap with registered fault cases, and automatically generating and correcting rules by which fault cause locations can be determined as characteristic fault events.

In networks which have already been operated, it is necessary to register fault information from past fault history information in order to generate these rules. The fault history information includes, for example, a fault location, a fault cause, and a fault countermeasure method.

CITATION LIST

Patent Literature

Patent Literature 1: JP 2018-028778 A

SUMMARY OF INVENTION

Technical Problem

However, in order to generate rules by which faults are estimated, it is necessary for people to manually register information and the like regarding fault generation devices after fault countermeasures are completed. Thus, there is a problem that registration delay or omission occurs in addition to necessity of operations by people.

An embodiment provides a registration device, a registration method, and a program for reliably and easily registering information for generating a fault estimation rule.

Solution to Problem

A registration device according to the embodiment includes an acquisition unit, a generation unit, a temporary registration unit, a calculation unit, a determination unit, and a registration unit. The acquisition unit acquires log data regarding a fault related to a faulty device in which a fault has been estimated to have occurred and a peripheral device installed around the faulty device. The generation unit generates one or more groups including similar event logs issued at a certain frequency or more from the log data. The temporary registration unit registers operation data as temporary training data when one or more event logs in a group including an event log corresponding to the training data for solving a fault correspond to the operation data related to an operation of a certain device in the group. The calculation unit calculates a certainty factor for each countermeasure against a fault of the device based on whether there is temporary training data related to the faulty device or the peripheral device. The determination unit determines whether the certainty factor is equal to or greater than a threshold. The registration unit registers the temporary training data of which the certainty factor is equal to or greater than the threshold as training data.

Advantageous Effects of Invention

According to the embodiment, it is possible to register information for generating a fault estimation rule reliably and easily.

BRIEF DESCRIPTION OF DRAWINGS

FIG. 3 is a diagram illustrating content of training data and operation data acquired by a log data acquisition unit in FIG. 2.

FIG. 5 is a diagram illustrating content of training data and operation data including a log of a clustering result of a group generation unit in FIG. 2.

FIG. 6 is a diagram illustrating a matching degree for each countermeasure name of operation data corresponding to training data for each of a faulty device and a peripheral device.

FIG. 8 is a diagram illustrating content of training data registered in a training DB of FIG. 2.

DESCRIPTION OF EMBODIMENTS

Hereinafter, embodiments will be described with reference to the drawings.

(Hardware Configuration)

Figure 1:
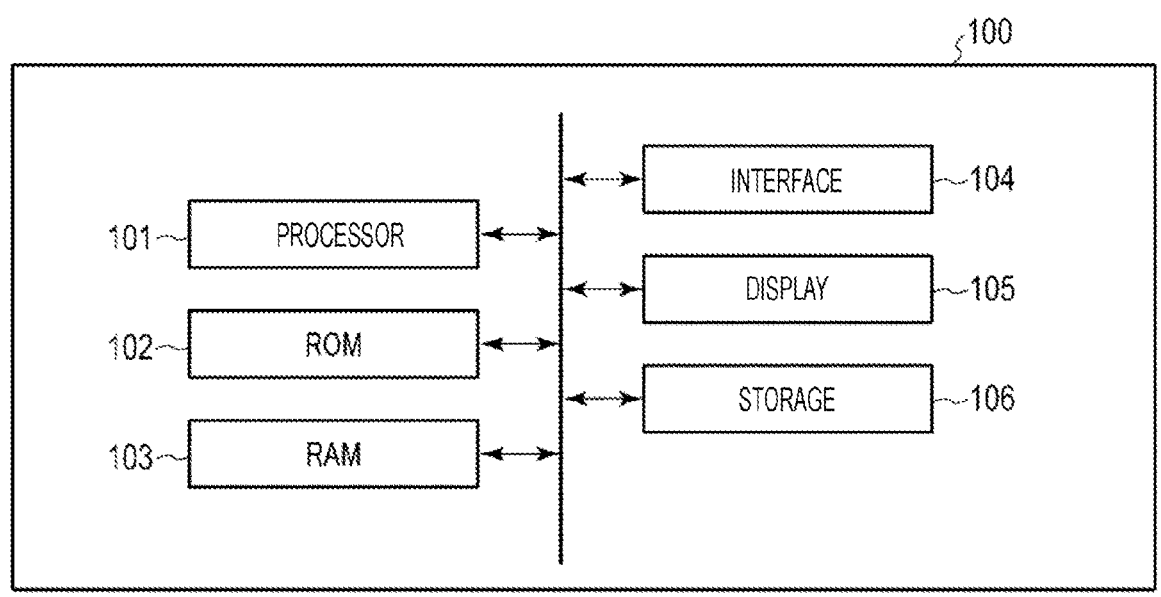
FIG. 1 is a diagram illustrating a hardware configuration of a fault information registration device according to an embodiment.

An example of a hardware configuration of a fault information registration device (also simply referred to as a registration device) according to an embodiment will be described with reference to FIG. 1.

A fault information registration device 100 according to the embodiment includes a processor 101, a ROM 102, a RAM 103, an interface 104, a display 105, and a storage 106.

The processor 101 is a processing device that controls the entire fault information registration device 100. The processor 101 is, for example, a central processing unit (CPU). The processor 101 is not limited to the CPU. Instead of the CPU, an application specific IC (ASIC) or the like may be used. The number of processors 101 may not be one, but may be two or more.

The ROM 102 is a read-only storage device. The ROM 102 stores firmware and various programs necessary for an operation of the fault information registration device 100.

The RAM 103 is a storage device capable of executing any writing. The RAM 103 is used as a work area for the processor 101 and temporarily stores firmware and the like stored in the ROM 102.

The interface 104 is a device that exchange information with an external device. The interface 104 receives, for example, operation data, training data, and an input from a user. The interface 104 may transmit and receive information to and from an external server or the like.

The display 105 is a display device that displays various screens. The display 105 may be a liquid crystal display, an organic EL display, or the like. Furthermore, the display 105 may include a touch panel.

The storage 106 is a storage device such as a hard disk. The storage 106 stores, for example, various applications which are executed by the processor 101, data which serves as an input of the application, and data which is obtained by executing the applications.

(Functional Configuration)

Figure 2:
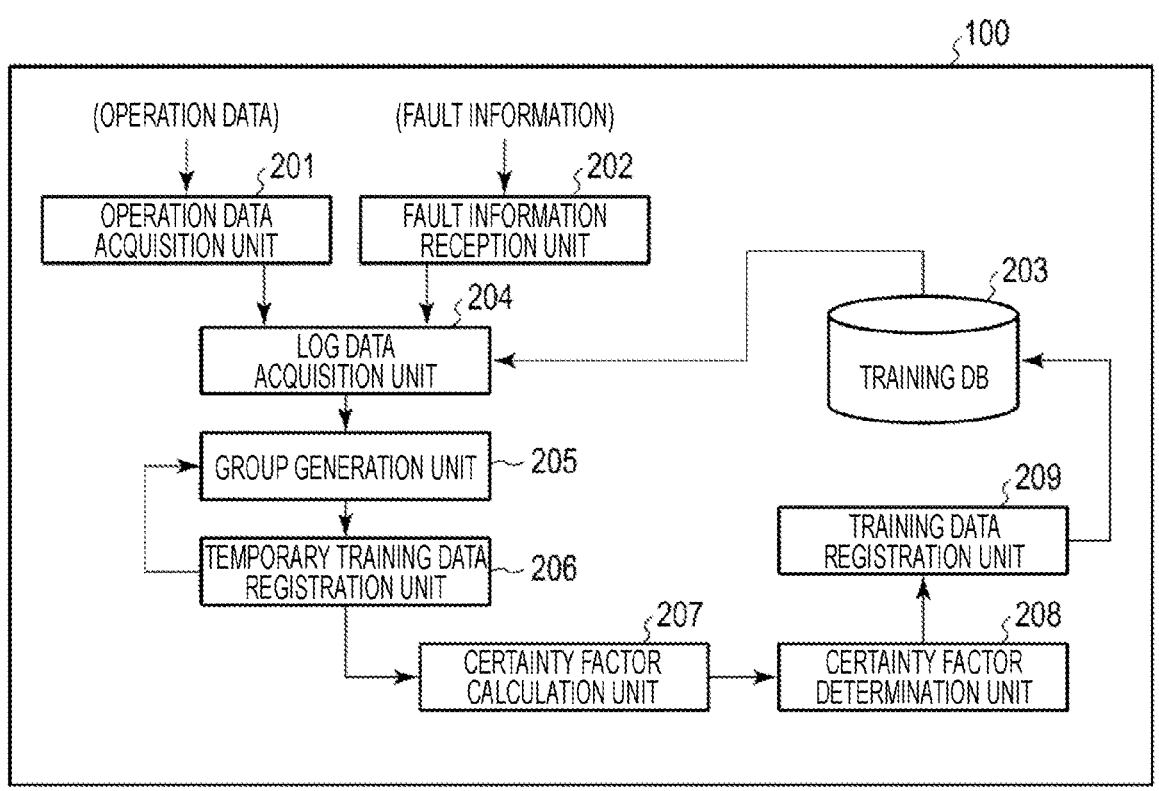
FIG. 2 is a diagram illustrating functions of the fault information registration device according to the embodiment.

Next, an example of a function of the fault information registration device 100 according to the present embodiment will be described with reference to FIG. 2.

The fault information registration device 100 according to the present embodiment includes, as functional blocks, an operation data acquisition unit 201, a fault information reception unit 202, a training database (hereinafter abbreviated as a DB.) 203, a log data acquisition unit 204, a group generation unit 205, a temporary training data registration unit 206, a certainty factor calculation unit 207, a certainty factor determination unit 208, and a training data registration unit 209.

The operation data acquisition unit 201 and the fault information reception unit 202 are realized by, for example, the interface 104. The log data acquisition unit 204, the group generation unit 205, the temporary training data registration unit 206, the certainty factor calculation unit 207, the certainty factor determination unit 208, and the training data registration unit 209 are realized by, for example, the processor 101, the ROM 102, the RAM 103, and the storage 106. The training DB 203 is realized by, for example, the storage 106. At least one of the fault information reception unit 202 or the training data registration unit 209 may be realized by, for example, the interface 104 and the display 105.

The operation data acquisition unit 201 is connected directly or via a network to acquire operation data from an external DB or the like. The operation data includes information regarding an operation of one or more devices. The operation data includes, for example, at least one piece of information among information regarding a fault of one or more devices, information regarding fault countermeasures, or information regarding recovery from the fault. As soon as the acquired operation data is received, the operation data acquisition unit 201 sequentially outputs the operation data to the log data acquisition unit 204. When a predetermined amount of the operation data is stored in a buffer (for example, in the operation data acquisition unit 201), the operation data acquisition unit 201 may sequentially output the operation data to the log data acquisition unit 204. The operation data will be described below with reference to FIG. 3.

The fault information reception unit 202 receives fault information determined by a user or a device with regard to a network fault instead of the user. The user or the device instead of the user investigates, for example, the operation data to estimate fault information. The fault information includes information indicating an estimated fault (for example, information including a fault name), information indicating a location where the fault has been estimated to have occurred, information indicating that certain countermeasures have been taken against the fault, and information indicating that recovery or no recovery has been achieved by the countermeasures.

The information indicating the location where the fault has been estimated to have occurred includes information regarding the faulty device in which a fault has been estimated to have occurred by the user and information regarding a peripheral device installed around the faulty device when the fault has occurred. The peripheral device is not defined by a physical distance from the faulty device, but is defined as a node close to the faulty device on the connection of the network. Accordingly, the peripheral device is more susceptible to an influence of the fault of the faulty device than other devices.

This fault information may not be accurate because it has been estimated by the user or a device instead of the user. However, even if inaccurate fault information is input, the fault information registration device 100 according to the present embodiment can register highly accurate training data through a process to be described below. As a result, the fault information registration device 100 can accurately estimate a fault, a fault location (also referred to as a fault position), and a device which has been recovered by countermeasures in the network. The fault location indicates a location on the network and is defined by, for example, at least one of a host name or an IP address.

The training DB 203 stores training data acquired in advance and training data newly registered by the training data registration unit 209. The training data acquired in advance is acquired from, for example, an external DB or the like by being connected via a network or directly. The training data includes information for generating a rule by which the fault position is estimated. The training data includes, for example, at least one of information regarding one or more faults, information regarding countermeasures against the fault, or information regarding recovery from the fault. The training data will be described below with reference to FIG. 3.

The log data acquisition unit 204 acquires the log data related to the faulty device and the peripheral device based on the fault information received by the fault information reception unit 202 from the log data including the operation data acquired by the operation data acquisition unit 201 and the training data stored in the training DB 203. That is, the log data acquisition unit 204 acquires log data related to the faulty device and the peripheral device estimated by the user.

The group generation unit 205 extracts event logs from the log data acquired by the log data acquisition unit 204 and executes a clustering process on the plurality of event logs. The event log is a log extracted from all pieces of log data of the operation data and the training data, and is, for example, Syslog. As an example of the event log, there are four event logs illustrated in a portion surrounded by a frame in FIG. 3. Rows of "training A" and "training B" in FIG. 3 indicate parts of data included in the training data, and rows of "operation A" and "operation B" in FIG. 3 indicate parts of data included in the operation data. The event log is included in each of the training data and the operation data.

The group generation unit 205 groups similar event logs based on an occurrence frequency of event logs generated by the faulty device and the peripheral device. The group generation unit 205 generally generates a plurality of groups in which similar event logs are grouped. In the clustering process, the event logs (or the events) similar to each other with regard to an occurrence frequency, an order, and the like of the event logs are grouped from the event logs issued by the devices (also referred to as nodes). There are, for example, Log Cluster and Drain as schemes for executing the clustering process, but the present invention is not particularly limited thereto.

The temporary training data registration unit 206 extracts a group including the event logs included in the training data from the group generated by the group generation unit 205. Then, the temporary training data registration unit 206 determines whether other event logs are included in the extracted group. When other event logs are included, it is determined whether the event logs are included in the operation data and are different from the event logs included in the training data. The event logs different from the event logs included in the training data and included in the operation data are adopted as new event logs.

Further, when other event logs are included in the extracted group, the event logs are included in the operation data, and the event logs are determined to be different from each other, the temporary training data registration unit 206 registers data in which the operation data and the training data including the event logs included in the group are merged as the temporary training data. The merged data is obtained, for example, by overwriting training data included in the group in only an item in which there is data of the operation data. An example of the temporary training data will be described below with reference to FIG. 5.

The temporary training data registration unit 206 repeatedly extracts a group including event logs included in the training data for each group generated by the group generation unit 205, repeats the foregoing process, and registers all the temporary training data. This temporary training data is temporarily stored in any storage device. The temporary training data is stored, for example, in a buffer provided in the temporary training data registration unit 206.

The certainty factor calculation unit 207 first collects temporary training data for each of the faulty device and the peripheral device. The certainty factor calculation unit 207 determines whether there is temporary training data related to the device for each device that is one of the faulty device and the peripheral device. Specifically, for example, the certainty factor calculation unit 207 determines that the device indicated by the device information included in the temporary training data is related to the temporary training data. Since the temporary training data includes the operation data including the device information, the temporary training data includes the device information (see, for example, FIGS. 3 and 5.). Then, when the information indicated in the countermeasure content (the item "countermeasure content" illustrated in FIG. 3 or 5) included in the temporary training data indicates the countermeasures—*— ("(countermeasures)" illustrated in FIG. 3 or 5), the certainty factor calculation unit 207 determines whether the countermeasures have been executed for each countermeasure. When the countermeasures have been executed, it is determined whether the recovery has been achieved by the countermeasures. The countermeasures include, for each countermeasure content defined by the measure name, whether countermeasures have been taken and whether recovery has been achieved by the countermeasures.

The certainty factor calculation unit 207 calculates a certainty factor for each countermeasure content based on countermeasures executed by a certain device and whether recovery has been achieved by the countermeasures. The certainty factor is one of indices corresponding to a probability indicating to which degree a certain countermeasure will lead to recovery of a device with respect to the countermeasure content for a faulty device. An example of the certainty factor will be described below with reference to FIG. 6.

The certainty factor calculation unit 207 calculates the certainty factor for each countermeasure against the fault of the device based on all the temporary training data registered by the temporary training data registration unit 206. As a result, the certainty factor calculation unit 207 can obtain these calculation results by calculating the certainty factor for each countermeasure content related to the faulty device and the peripheral device.

The certainty factor determination unit 208 determines whether each certainty factor calculated by the certainty factor calculation unit 207 is equal to or greater than a threshold. This threshold may be set in advance by the user or may be set depending on an algorithm used for the clustering process of the group generation unit 205, a calculation scheme of the certainty factor executed by the certainty factor calculation unit 207, or the like. The threshold may be adaptively determined according to the accuracy of the training data registered in the training DB 203. For example, when the certainty factor determination unit 208 determines that the accuracy of the training data tends to be lowered, the threshold is raised. Further, the threshold may also be determined referring to the number of pieces of training data registered in the training data registration unit 209. For example, when the certainty factor determination unit 208 determines that the number of pieces of registered training data tends to decrease, this tendency may be set as one of the factors for lowering the threshold.

The training data registration unit 209 receives the determination result of the certainty factor determination unit 208, and registers, in the training DB 203, temporary training data corresponding to the countermeasure content for which the certainty factor is determined to be equal to or greater than the threshold as (true) training data.

At least one of the fault information reception unit 202 or the training data registration unit 209 may display, for example, the received fault information or the registered training data. Based on the display, the user or a device instead of the user can monitor the fault information registration device 100 and it is expected that the registration accuracy would be improved by the monitoring. At least one of the fault information reception unit 202 or the training data registration unit 209 may present information to the user or a device instead of the user through sound without being displayed on a presentation unit. At least one of the fault information reception unit 202 or the training data registration unit 209 may transmit information in accordance with another method regardless of display or sound when the information is transmitted to the user or the device instead of the user.

The fault information registration device 100 can maintain the training data stored in the training DB 203 by clustering the event logs. As a result of this maintenance, the fault information registration device 100 can register information for generating a rule by which the fault position is accurately estimated.

(Training Data, Operation Data, and Clustering)

An example of the training data and the operation data will be described with reference to FIG. 3.

The training data includes an event log, countermeasure content, and a regular expression corresponding to the countermeasure content. The countermeasure content includes at least one of information regarding a fault, information regarding countermeasures against the fault, or information regarding recovery from the fault. A row of the training A illustrated in FIG. 3 shows training data and shows that the training data includes an event log, "restart port: 03", countermeasure content indicating that the countermeasures are "card restart (countermeasures)", and a regular expression of the countermeasure content of "restart port: ID< >". Similarly, the training data shown in the row of the training B illustrated in FIG. 3 shows that an event log, "restart-OK", countermeasure content indicating recovery of "card restart (recovery)", and a regular expression of the countermeasure content of "restart-OK" are included.

"restart port: ID< >" indicates that countermeasures are taken by restarting a port of an ID. The ID is a variable and corresponds to a specific ID number (for example, a natural number) in the operation data. "restart-OK" indicates that the device has been restarted (recovered) by corresponding measures.

The operation data includes an event log and a device IP, as illustrated in FIG. 3. Although not explicitly illustrated in FIG. 3, the operation data includes at least one of information regarding a fault of a certain device or information regarding content of the fault. The information regarding the fault of the certain device includes, for example, a date and time at which a fault has occurred, a location (a device IP such as a host name and an IP address) where the fault has occurred, and the degree of emergency (Emerg, Alert, Notice, Info, or the like) to taken countermeasures against the fault. The information regarding the content of the fault includes, for example, at least one of information regarding countermeasures against the fault or information regarding recovery from the fault. Hereinafter, for the operation data, a device IP indicating an occurrence location of a fault and an event log including information regarding countermeasures against or recovery from the fault, which are mainly used in the present embodiment will be focused on. Therefore, in the embodiment, it is assumed in description that the operation data includes at least one of the pieces of information of interest. it is noted that the operation data includes the above-described information in addition to the information of interest, even if not specified.

"Operation A" illustrated in FIG. 3 indicates operation data and includes information indicating that a fault has occurred in the device IP of XX and information regarding countermeasures against the fault such as "restart port: 12", "Operation B" illustrated in FIG. 3 indicates operation data and includes information indicating that a fault has occurred in the device IP of YY and information regarding countermeasures against the fault such as "re-insert card: 04".

"restart port: 12" means that specific number 12 is designated and indicates that countermeasures are taken against the fault by restarting this port 12. "re-insert card: 04" means that specific number 04 is designated and indicates that countermeasures are taken against the fault by reinserting the card of 04.

The clustering process executed by the group generation unit 205 is executed on the event log included in each of all the pieces of log data of the operation data and the training data. In the example of FIG. 3, these event logs are four Syslogs included in the enclosure in FIG. 3. That is, the group generation unit 205 executes clustering on "restart port: 03", "restart-OK", "restart port: 12", and "re-insert card: 04", which are four event logs.

(Temporary Training Data Registration Process)

Figure 4:
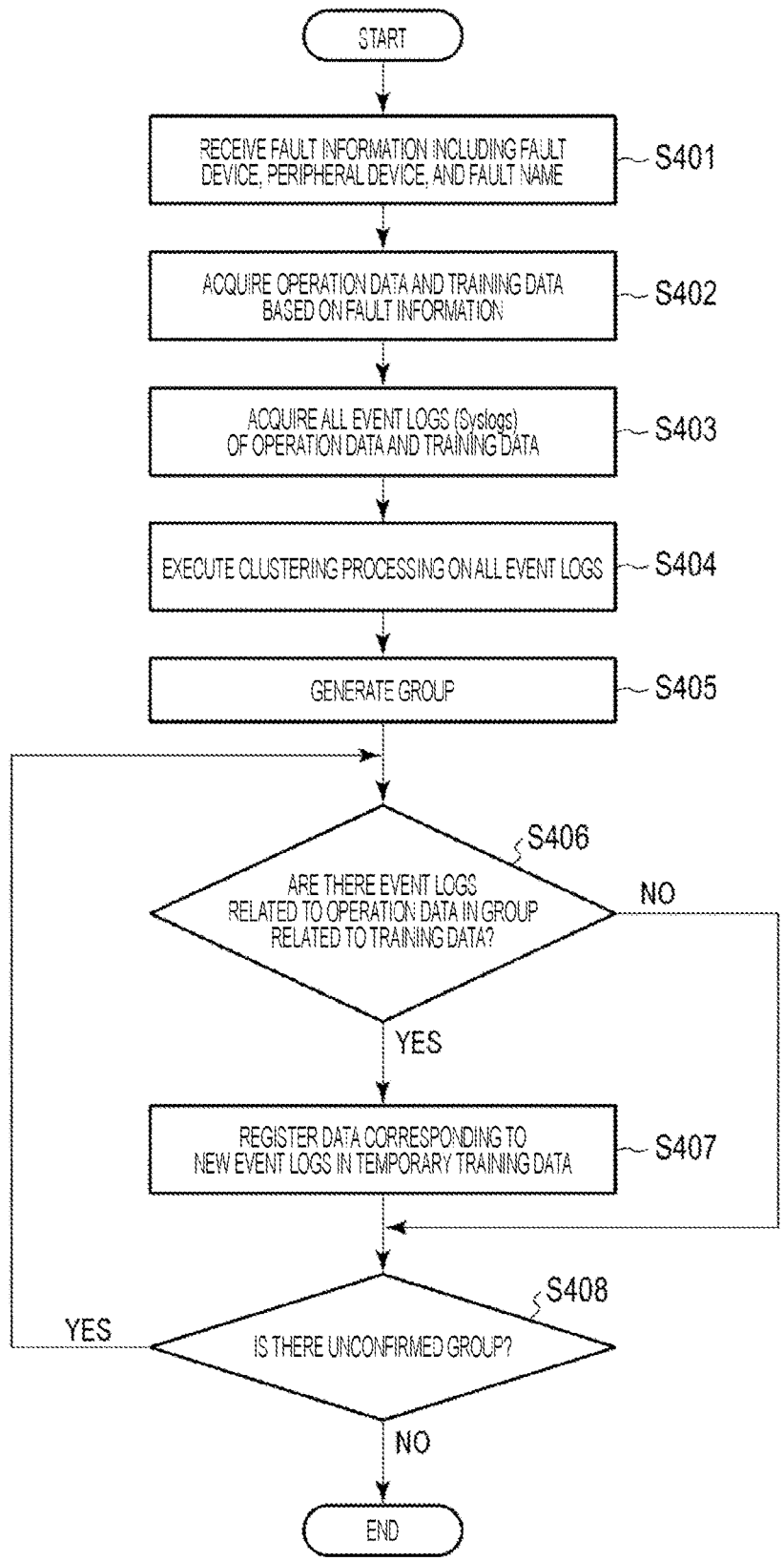
FIG. 4 is a flowchart illustrating registration of temporary training data which is an example of an operation of the fault information registration device according to the embodiment.

Next, an example of an operation until the fault information registration device 100 registers the temporary training data will be described with reference to FIG. 4.

In step S401, the fault information reception unit 202 receives the fault information determined by the user or the device instead of the user.

In step S402, the log data acquisition unit 204 acquires the operation data acquired from the operation data acquisition unit 201 and the training data acquired from the training DB 203 based on the fault information received from the fault information reception unit 202.

In step S403, the group generation unit 205 acquires all the event logs included in the operation data and the training data acquired by the log data acquisition unit 204 from the operation data and the training data.

In step S404, the group generation unit 205 executes the clustering process on all the event logs acquired in step S403.

In step S405, the group generation unit 205 groups similar event logs based on the occurrence frequency of the event logs. As a result, the group generation unit 205 generates one or more groups including similar event logs.

In step S406, when the event logs included in the training data are included in a certain group generated in step S405, the temporary training data registration unit 206 determines whether the event logs included in the operation data are included in this group. When the temporary training data registration unit 206 determines that the event logs included in the operation data are included in this group and determines that the event logs included in the training data are different from the event logs included in the operation data, the process proceeds to step S407. When the temporary training data registration unit 206 determines that the event logs included in the operation data are not included in this group, the process proceeds to step S408. When it is determined that the event logs included in the training data are different from the event logs included in the operation data, it can be said that the event logs included in the operation data are new event logs.

In step S407, the temporary training data registration unit 206 registers, as temporary training data, data in which the operation data including the new event logs determined to be included in step S406 and the training data including the event logs included in the group in step S406 are merged.

In step S408, the temporary training data registration unit 206 determines whether there is a group (referred to as an unconfirmed group) that has not been determined whether the event logs included in the training data are included among the groups generated in step S405. When the temporary training data registration unit 206 determines that there is an unconfirmed group, the process returns to step S406. When it is determined that there is no unconfirmed group, the process ends.

(Temporary Training Data)

The temporary training data registered by the temporary training data registration unit 206 will be described with reference to FIG. 5.

In the example of FIG. 5, a row of "operation A" shows the content of the temporary training data. In the example of FIG. 5, "restart port: 03" which is an event log included in the training data (the row of "training A") and "restart port: 12" which is an event log included in the operation data (the row of "operation A") are classified into the same group by the group generation unit 205. The temporary training data illustrated in FIG. 5 is obtained by overwriting the operation data of the "operation A" illustrated in FIG. 3 in the content of the training data including the event log "restart port: 03"

(the row of the "training A" in FIG. 5). "restart port: ID< >" that is a regular expression and "card restart (countermeasures)" that is countermeasure content described in underline and bold in FIG. 5 are content in which a part of the overwritten training data remains, and "restart port: 12" that is the remaining Syslog and "XX" that is a device IP are the content of the operation data in which the training data is changed by overwriting the corresponding data of the training data.

(Countermeasures and Recovery)

Countermeasures against and recovery from a fault occurring in the device will be described using FIG. 6.

Examples of the countermeasure content defined by the countermeasure name include "card restart" and "port change" illustrated in FIG. 6. In the example of FIG. 6, whether countermeasures have been taken is described in an item of "countermeasures". When countermeasures have been taken, "o" is indicated. When countermeasures have not been taken, "X" is indicated. In the example of FIG. 6, similarly, whether it has been recovered by corresponding countermeasures is described in an item of "recovery". When it has been recovered, "o" is indicated. When it has not been recovered, "X" is indicated. In the example illustrated in FIG. 6, the response name "card restart" indicates that the device IP which is XX has been recovered by the countermeasures, but the device IP which is YY has not been recovered by the countermeasures. On the other hand, for the countermeasure name "port change", it is indicated that two countermeasures have not been executed and recovery has not been made regardless of whether the device IP is XX or YY.

(Certainty Factor)

The certainty factor of a certain device for each countermeasure content will be described with reference to FIG. 6.

The certainty factor of the device is calculated for each countermeasure content as illustrated in FIG. 6. Specifically, for example, the certainty factor calculation unit 207 determines that the certainty factor is 1 if countermeasures are taken for certain measure content, determines that the certainty factor is 0 if the countermeasures are not taken, determines that the certainty factor is 1 if the recovery is achieved by the countermeasures, and determines that the certainty factor is 0 if the recovery is not achieved. Then, the certainty factor calculation unit 207 calculates, as a certainty factor, a sum of 0 or 1 depending on whether countermeasures have been taken and 0 or 1 depending on whether recovery has been achieved with respect to a sum of the number of types of executed countermeasures and 1 corresponding to recovery. The device IP of "XX" in FIG. 6 with the countermeasure name "card restart" indicates that the countermeasures have been taken. As a result, the recovery has been achieved. Therefore, when the device IP is "XX" and the countermeasure name is "card restart", the certainty factor is (1+1)/(1+1)=2/2=1. On the other hand, when the device IP is "YY" and the countermeasure name is "card restart", the certainty factor is (0+0)/(1+1)=0/2=0. In the response name "card restart", the certainty factor is (0+0+0)/(2+1)=0/3=0 regardless of whether the device IP is "XX" or "YY".

(Training Data Registration Process)

Figure 7:
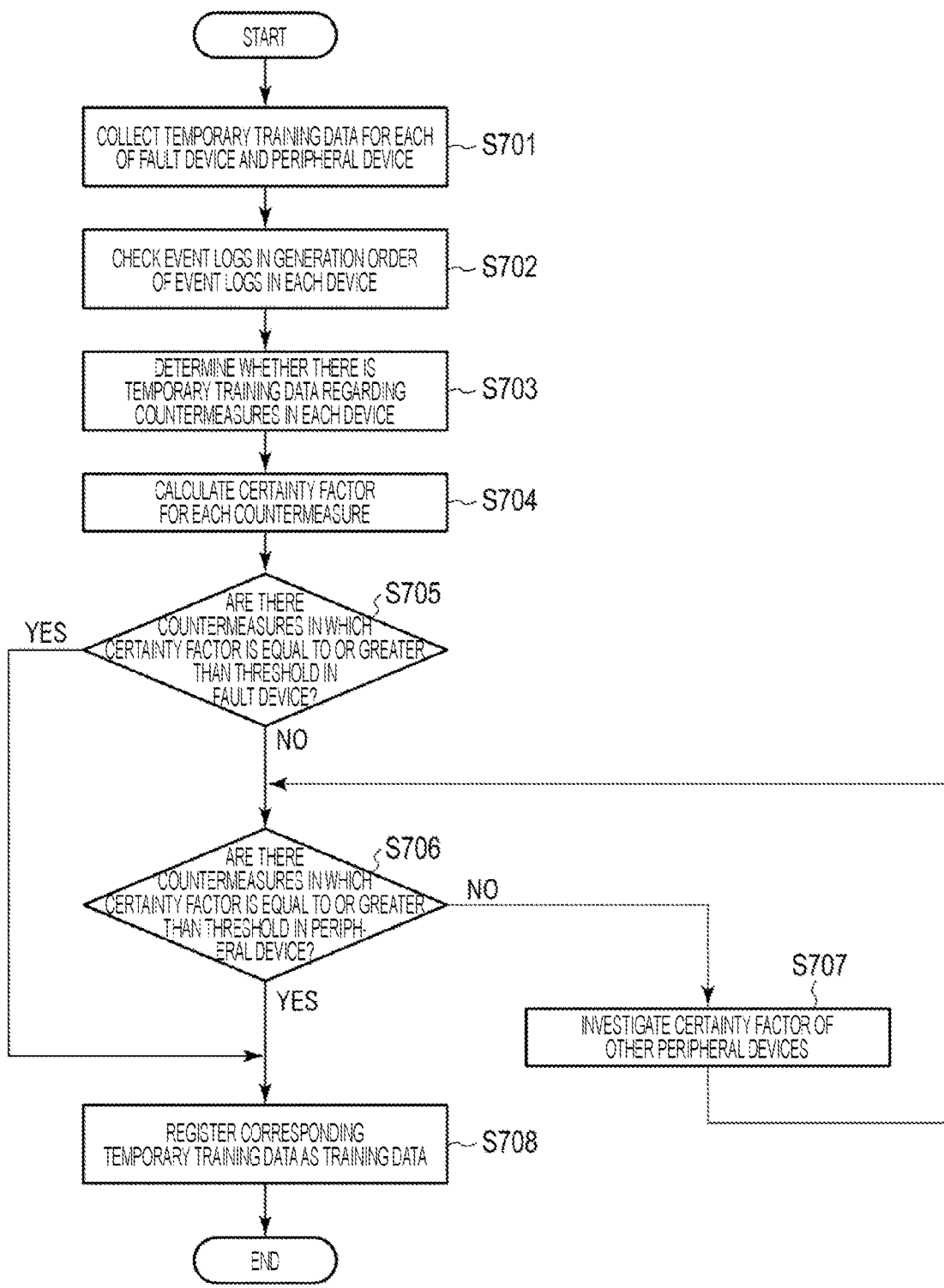
FIG. 7 is a flowchart illustrating registration of training data which is an example of an operation of the fault information registration device according to the embodiment.

Next, an example of an operation of processes from collection of temporary training data to registration of training data by the fault information registration device 100 will be described with reference to FIG. 7.

In step S701, the certainty factor calculation unit 207 collects temporary training data for each of the faulty device and the peripheral device.

In step S702, the certainty factor calculation unit 207 checks the event logs generated in each device, which is one of the faulty device and the peripheral device, in the occurrence order of the event logs. The certainty factor calculation unit 207 tracks a date and time of the operation data for each generating device and checks, in the order of fault, the countermeasures, and the recovery, whether there is a fault, whether countermeasures are taken for each countermeasure content, and whether recovery has been made according to the countermeasures.

In step S703, when there is countermeasure content related to this device for each device which is one of the faulty device and the peripheral device, the certainty factor calculation unit 207 determines whether there is temporary training data for each countermeasure content. Through this determination, it is determined whether countermeasures are taken for each countermeasure content and whether recovery have been made according to the countermeasures.

In step S704, the certainty factor calculation unit 207 calculates the certainty factor for each countermeasure content from the result of step S703 for each device that is one of the faulty device and the peripheral device.

In step S705, the certainty factor determination unit 208 determines whether the certainty factor is equal to or greater than a threshold for each certainty factor calculated in step S704 in the faulty device. When it is determined that there is countermeasure content of which the certainty factor is equal to or greater than the threshold in the faulty device, the process proceeds to step S708. When it is not determined that there is countermeasure content of which the certainty factor is equal to or greater than the threshold in the faulty device, the process proceeds to step S706.

In step S706, the certainty factor determination unit 208 determines whether the certainty factor is equal to or greater than the threshold for each certainty factor calculated in step S704 in one peripheral device. When it is determined that there is countermeasure content of which the certainty factor is equal to or greater than the threshold in this peripheral device, the process proceeds to step S708. When it is determined that there is no countermeasure content of which the certainty factor is equal to or greater than the threshold in this peripheral device, the process proceeds to step S707.

In step S707, the certainty factor determination unit 208 determines to investigate a certainty factor of a peripheral device different from the peripheral device determined in step S706, and step S706 is executed on the peripheral device determined to be investigated. When it is determined in step S707 that there is no peripheral device to be investigated, the process ends.

In step S708, the training data registration unit 209 receives a determination result of the certainty factor determination unit 208, and registers temporary training data corresponding to the countermeasure content of which it is determined that the certainty factor is equal to or greater than the threshold as (true) training data in the training DB 203.

When it is estimated that there are a plurality of faulty devices, step S705 and subsequent steps are executed for each faulty device. In this case, the peripheral device in step S706 is a peripheral device related to the faulty device in step S705.

A mode in which the training data registration unit 209 registers the training data in the training DB 203 in step S708 will be described with reference to FIG. 8.

FIG. 8 illustrates an example of a case where the temporary training data registered in step S407 is the data indicated by "operation A" in FIG. 5 and the temporary training data is registered in step S708. The training data of "training A"

illustrated in FIG. 5 is already stored in the training DB 203. In this case, the training data registration unit 209 adds an event log corresponding to newly registered training data only to an event log (Syslog) of "training A" in which the regular expression and the countermeasure content are the same.

In the training data registered in the training DB 203, as illustrated in FIG. 8, an event log, a regular expression, and countermeasure content are described for each piece of training data. A plurality of event logs may be described in an item (Syslog) of the event log.

In the fault information registration device according to the above-described embodiment, a faulty device in which a fault has been estimated to have occurred and log data related to the peripheral devices are acquired, and event logs similar by a certain frequency or more are grouped. Then, when there is an event log corresponding to the operation data in the group including the event log corresponding to training data for eliminating the fault, the fault information registration device according to the present embodiment can register the operation data as temporary training data, and calculate the certainty factor for each countermeasure content against a fault of the device based on whether there is the temporary training data for each device. The fault information registration device according to the present embodiment registers temporary training data that has a certainty factor equal to or greater than the threshold as true training data. Therefore, the fault information registration device according to the present embodiment can store more accurate training data for solving the fault in the training DB. As a result, the fault information registration device according to the present embodiment can accurately estimate a fault position in the network.

In addition, according to the fault information registration device of the present embodiment, resources for inputting many types of data necessary for learning a rule including a fault cause and a fault alarm can be reduced. Since this resource is reduced, according to the present embodiment, there is an advantageous effect that a time in which a database is generated with higher accuracy for solving the fault is also shortened. Therefore, according to the present embodiment, a time from recovery from a fault to learning is shortened.

Modification Examples

<Teaching DB 203>

At least one of the training DB 203 or the buffer included in the temporary training data registration unit 206 may not be included in the fault information registration device 100 and may be outside of the fault information registration device 100. For example, at least one of the training DB 203 or the buffer included in the temporary training data registration unit 206 may be included in an external server or the like. In this case, the fault information registration device 100 exchanges information with at least one of the training DB 203 or the buffer included in the temporary training data registration unit 206 via the interface 104.

The device according to the embodiment can also be realized by a computer and a program, and the program can be recorded in a recording medium (or a storage medium) or provided via a network.

Each of the above-described devices and the device portions can be implemented in either a hardware configuration or a configuration of a combination of hardware resources and software. As the software that has the combined configuration, a program which is installed in advance in a computer from a network or a computer-readable recording medium (or storage medium) and is executed by a processor of the computer to cause the computer to realize the operation (or function) of each device is used.

The present invention is not limited to the foregoing embodiments, and various types of modifications can be made at an implementation stage without departing from the gist of the invention. Each embodiment may be implemented in appropriate combination, and combined advantageous effects can be obtained in that case. Further, the foregoing embodiments include various inventions, and various inventions can be extracted in combinations selected from among the disclosed components. For example, even if some components are deleted from all the components described in the embodiments, a configuration from which the components have been deleted can be extracted as an invention in a case where the problem can be solved and the advantageous effects can be obtained.

REFERENCE SIGNS LIST

100 Fault information registration device
101 Processor
102 ROM
103 RAM
104 Interface
105 Display
106 Storage
201 Operation data acquisition unit
202 Fault information reception unit
203 Training DB
204 Log data acquisition unit
205 Group generation unit
206 Temporary training data registration unit
207 Certainty factor calculation unit
208 Certainty factor determination unit
209 Training data registration unit

The invention claimed is:

1. A registration device comprising:
an acquisition unit, comprising one or more processors, configured to acquire log data regarding a fault related to a faulty device in which the fault has been estimated to have occurred and a peripheral device installed around the faulty device;
a generation unit, comprising one or more processors, configured to generate one or more groups including similar event logs issued at a certain frequency or more from the log data;
a temporary registration unit, comprising one or more processors, configured to register operation data as temporary training data when one or more event logs in a group including an event log corresponding to training data for solving the fault correspond to the operation data related to an operation of a certain device in the group;
a calculation unit, comprising one or more processors, configured to calculate a certainty factor for each countermeasure against the fault of the faulty device based on whether there is temporary training data related to the faulty device or the peripheral device;
a determination unit, comprising one or more processors, configured to determine whether the certainty factor is equal to or greater than a threshold; and
a registration unit, comprising one or more processors, configured to register the temporary training data of which the certainty factor is equal to or greater than the threshold as the training data.

2. The registration device according to claim 1, wherein the generation unit is configured to generate the group by executing a process by clustering for grouping similar event logs based on an occurrence frequency of event logs generated by the faulty device and the peripheral device.

3. The registration device according to claim 1, wherein the determination unit is configured to determine whether the certainty factor of the faulty device is equal to or greater than the threshold, and determine whether the certainty factor of the peripheral device is equal to or greater the threshold when the certainty factor of the faulty device is less than the threshold.

4. The registration device according to claim 1,
wherein the registration unit is configured to register temporary training data corresponding to the certainty factor as training data when the certainty factor of the faulty device is equal to or greater than the threshold, and
the determination unit is configured not to determine the certainty factor of the peripheral device when the certainty factor of the faulty device is equal to or greater than the threshold.

5. The registration device according to claim 1, wherein the generation unit is configured to generate the group using, as the log data, data including the training data including at least any one of information regarding the fault, countermeasure information of the fault, or recovery information of the fault, and the operation data including at least one of information regarding a fault of the certain device or information regarding a content related to the fault.

6. The registration device according to claim 1, further comprising:
a reception unit, comprising one or more processors, configured to receive fault information regarding the faulty device in which the fault has been estimated to have occurred and the peripheral device installed around the faulty device,
wherein the acquisition unit is configured to acquire the log data based on the fault information.

7. A registration method comprising:
acquiring, by an acquisition unit, log data regarding a fault related to a faulty device in which the fault has been estimated to have occurred and a peripheral device installed around the faulty device;
generating, by a generation unit, one or more groups including similar event logs issued at a certain frequency or more from the log data;
registering, by a temporary registration unit, operation data as temporary training data when one or more event logs in a group including an event log corresponding to training data for solving the fault correspond to the operation data related to an operation of a certain device in the group;
calculating, by a calculation unit, a certainty factor for each countermeasure against the fault of the faulty device based on whether there is temporary training data related to the faulty device or the peripheral device;
determining, by a determination unit, whether the certainty factor is equal to or greater than a threshold; and
registering, by a registration unit, the temporary training data of which the certainty factor is equal to or greater than the threshold as the training data.

8. A non-transitory computer readable medium storing a program, wherein execution of the program causes a computer to function as each unit of the registration device according to claim 1.

* * * * *